(12) United States Patent
van Willigen et al.

(10) Patent No.: US 8,881,602 B2
(45) Date of Patent: Nov. 11, 2014

(54) MAGNETIC-INDUCTIVE FLOWMETER

(75) Inventors: Arnould Leendert van Willigen, Capelle a/d (NL); Wenny Poortman, Dordrecht (NL)

(73) Assignee: Krohne AG, Basel (CH)

( * ) Notice: Subject to any disclaimer, the term of this patent is extended or adjusted under 35 U.S.C. 154(b) by 163 days.

(21) Appl. No.: 13/531,974

(22) Filed: Jun. 25, 2012

(65) Prior Publication Data

US 2013/0263676 A1 Oct. 10, 2013

(30) Foreign Application Priority Data

Apr. 5, 2012 (DE) .......................... 10 2012 006 891

(51) Int. Cl.
*G01F 1/00* (2006.01)
(52) U.S. Cl.
USPC ...................................... 73/861.12
(58) Field of Classification Search
USPC ................ 73/861.12, 861.17, 861.15, 861.11
See application file for complete search history.

(56) References Cited

U.S. PATENT DOCUMENTS

| | | | |
|---|---|---|---|
| 4,147,058 A * | 4/1979 | Matsushita | 73/861.12 |
| 4,736,635 A * | 4/1988 | Murase | 73/861.15 |
| 4,905,517 A * | 3/1990 | Crowe et al. | 73/654 |
| 5,090,250 A | 2/1992 | Wada | |
| 5,448,920 A | 9/1995 | Ketelsen et al. | |
| 5,503,026 A | 4/1996 | Böhm et al. | |
| 5,503,027 A * | 4/1996 | Hemp | 73/861.12 |
| 6,092,428 A | 7/2000 | Brockhaus | |
| 6,829,946 B2 * | 12/2004 | Yamamoto | 73/861.12 |
| 7,369,949 B2 | 5/2008 | Yamamoto | |
| 7,487,052 B2 * | 2/2009 | Yamamoto | 702/50 |
| 8,074,525 B2 | 12/2011 | van Willigen | |

FOREIGN PATENT DOCUMENTS

| | | |
|---|---|---|
| DE | 28 56 240 A1 | 7/1980 |
| DE | 196 37 716 C1 | 4/1998 |
| DE | 20 2004 009 798 U1 | 9/2004 |
| DE | 10 2004 018 747 A1 | 11/2005 |
| DE | 10 2009 045 274 A1 | 4/2011 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A magnetic-inductive flowmeter (1) for measuring the through-flow of a flowing medium (2), with a measuring line (3), a magnetic field generating device (4) and two electrodes (6) for picking off a measuring voltage induced in the flowing medium (2). In the case of the flowmeter in question a supplementary magnetic field generating device (7) is provided for generating a supplementary magnetic field at least partially passing through the measuring line (3), the supplementary magnetic field at least partially extending parallel to the longitudinal axis (5) of the measuring line (3) in the region of the measuring line (3) in which the two electrodes (6) are located. In this way, measuring of the degree of filling of the measuring line takes place in a manner that is as easy as possible.

10 Claims, 3 Drawing Sheets

MAGNETIC-INDUCTIVE FLOWMETER

BACKGROUND OF THE INVENTION

1. Field of the Invention

The invention relates to a magnetic-inductive flowmeter for measuring the through-flow of a flowing medium, with a measuring line, a magnetic field generating device for generating a magnetic field—in particular, an alternating magnetic field—passing at least partially through the measuring line essentially perpendicularly to a longitudinal axis of the measuring line, and with at least two electrodes—in particular, in contact with the medium—for picking off a measuring voltage induced in the flowing medium.

2. Description of Related Art

The underlying principle of a magnetic-inductive flowmeter for measuring the through-flow of a flowing medium is attributable to Faraday, who back in the year 1832 proposed applying the principle of electrodynamic induction to measuring the flow rate of a flowing medium. According to Faraday's law of induction, in a flowing medium that entrains charge carriers and flows through a magnetic field, an electric field strength perpendicular to the direction of flow and perpendicular to the magnetic field is produced. Faraday's law of induction is used for magnetic-inductive flowmeters in that a magnetic field is generated by means of a magnetic field generating device, which usually has two magnetic coils to which current is applied, and is passed through a measuring line, the magnetic field generated having at least one component that extends perpendicularly to the direction of flow. Within the magnetic field, each volume element of the flowing medium that moves through the magnetic field and has a certain number of charge carriers makes a contribution to a measuring voltage that can be picked off by way of the electrodes with the field strength that is produced in this volume element.

For the determination of the through-flow of an electrically conductive medium, it is required that the measuring line is completely filled with the medium or, if it is not completely filled, at least that the degree of filling is known, so that the measured values can be corrected appropriately. Such correction values and the determination thereof are discussed, for example, in the German Patent DE 196 37 716 C1. The degree of filling of the measuring line can, for example, be determined capacitively, according to the patent specification DE 196 55 107 C2 and corresponding U.S. Pat. No. 6,092,428.

In this case, with the medium as a dielectric, the electrodes form a capacitor, the capacitance of which is measured. According to German Utility Model DE 20 2004 009 798 U1, the filling level of a liquid in the measuring conductor is determined by the transit time method. According to the German Patent Application DE 10 2009 045 274 A1, it is also made possible for measuring to be carried out for a partially filled measuring line by the electrode arranged above the measuring line having an electrically conductive continuation, which is located in the measuring line and during measuring operation is in connection with the medium. The laid-open German Patent Application DE 28 56 240 describes an alternating measurement of through-flow and degree of filling, for which at one time a constant magnetic field is generated and at another time an alternating magnetic field is generated.

It follows that, in the prior art, measuring principles that differ to some extent are combined in order to obtain findings concerning the filling level and the through-flow. To some extent, the values for the through-flow and the filling level are also obtained at different points in time.

SUMMARY OF THE INVENTION

In view of the foregoing, an object of the invention is to provide a magnetic-inductive flowmeter of the initially mentioned type in which the measuring of the degree of filling of the measuring line takes place in a way that is as easy as possible, and in particular, at the same time as the measuring of the through-flow to the extent possible.

The magnetic-inductive flowmeter formed according to the invention is initially and essentially wherein at least one supplementary magnetic field generating device—in particular arranged outside the measuring line—is provided for generating a supplementary magnetic field—in particular, an alternating supplementary magnetic field—at least partially passing through the measuring line. The supplementary magnetic field at least partially extends essentially parallel to the longitudinal axis of the measuring line in the region of the measuring line in which the two electrodes are located.

In the measuring line, which, for example, is made of a fiber-reinforced polymer or a non-magnetic metal, two magnetic fields are generated, acting on the electrically conductive medium. In the first instance, the magnetic field that serves for the actual flow measurement and extends both perpendicularly to the longitudinal axis, and consequently, generally also perpendicularly to the direction of flow of the medium, and perpendicularly relative to an imaginary connecting axis between the electrodes. This magnetic field is causally responsible for the induction voltage that can be picked off from the two electrodes.

This magnetic field is accompanied by a supplementary magnetic field, which extends parallel to the longitudinal axis. As a result, this supplementary magnetic field is perpendicular to the first-mentioned magnetic field and perpendicular to a plane in which the two electrodes lie, and serves for determining the degree to which the measuring line is filled with the medium. The supplementary magnetic field is, in this case, preferably homogeneous over the measuring plane between the two electrodes. The voltage that is obtained as a result of the supplementary magnetic field and is present at the two electrodes is, in this case, dependent on the medium or on the quantity of medium that is passed through by the supplementary magnetic field. Therefore, this voltage or this voltage component of the voltage signal that can be picked off from the two electrodes is a measure of the filling level of the medium.

In one configuration, a signal in the form of a voltage signal that is obtained overall as a result of the superimposing of the effects of the two magnetic fields is picked off, in particular, from the electrodes. This produces the advantage that the through-flow and the degree of filling are measured simultaneously, so that the measured value for the through-flow can also be appropriately corrected. In order to extract the two items of information concerning the through-flow and the filling level more easily from a signal (hereafter, the filling level is understood generally as meaning a measure of the degree of filling of the measuring line by the medium), it is provided in particular, in an advantageous configuration, that the magnetic field generating device generates a magnetic field alternating with a first frequency and the supplementary magnetic field generating device generates a supplementary magnetic field alternating with a second frequency. In this case, the first frequency and the second frequency are different. If the first frequency usually lies between 1 Hz and 100 Hz, the second frequency for the supplementary magnetic field lies, for example, between 100 Hz and 10 kHz. The evaluation of the measuring signals advantageously then takes place frequency-selectively, for example, by frequency filtering of the overall signal.

In a further configuration, the frequency profiles of the magnetic and supplementary magnetic fields, respectively configured as alternating fields, have different forms. Thus, in one configuration, the supplementary magnetic field is generated with an alternating current or with a signal changing the frequency linearly—for example, with a sawtooth profile. The magnetic field may, in this case, have a different or identical frequency profile. Distinctly different frequencies allow the signals to be separated better. In an alternative configuration, or for example, for calibrating purposes, the two measurements can also be carried out separately from one another, in that the magnetic field generating device and the supplementary magnetic field generating device are activated correspondingly. The supplementary magnetic field generating device is, in particular, electrically isolated from a wall of the measuring line, possibly a metallic wall, and for this, for example, is arranged outside of the measuring line or in a liner.

The following configurations relate to advantageous designs of the electrodes. In one configuration, it is provided that the two electrodes—configured in particular essentially identically—are essentially in strip form. In order to determine the filling level as well as possible, it may be advantageous to encompass as large a circumference of the measuring line as possible. Therefore, strip-form electrodes that are aligned with their longitudinal axes along the circumference lend themselves to this. In this case, the two electrodes are opposite one another essentially at the same level along the longitudinal axis of the measuring line. In one configuration, at least one strip-form electrode extends over almost half the inner circumference of the measuring line. The advantages of strip-form electrodes are that, in comparison with point electrodes, they penetrate "deeper" into the medium, and as a result, are influenced less by local disturbances in the vicinity of the inner wall of the measuring line. Furthermore, the sensitivity to frothing on the surface of the medium is reduced. And finally, the dependence on disturbances in the flow profile of the medium is reduced.

The previously mentioned configurations relate essentially to configurations of magnetic-inductive flowmeters that are known to some extent. In these, the two electrodes may be configured differently or else identically. By varying the form of the electrodes, it is possible also in conjunction with the supplementary magnetic field to bring about the effect that the supplementary magnetic field is as homogeneous as possible in the region of the measuring plane bounded by the electrodes. Furthermore, the electrodes may be in contact with the medium or free from contact with the medium. In an additional configuration, more than two electrodes are provided. The following configurations relate more to also determining the filling level of the medium with the measuring arrangement.

For the following configuration, strip-form electrodes are advantageously provided in particular. However, at the same time, other forms of electrode can generally also be used, or else different electrodes can be combined with one another. The induced voltage of interest and the voltage obtained on the basis of the charge separation within the medium can in principle be picked off at any desired point of the electrodes.

In one configuration, the two electrodes—in particular, in strip form—in each case have two end faces, given an arrangement of the electrodes, for example, along a circumferential line of the measuring line, one end face of the one electrode respectively being adjacent to one end face of the other electrode so that, altogether there, are two pairs of adjacent end faces of the electrodes. If the strip-form electrodes are attached to the sides of the measuring line, given an essentially horizontal mounting of the measuring line, there is one pair of end faces below and the other pair above in relation to a flowing medium or offset in relation to one another in the direction in which gravitational force acts.

It has surprisingly been found that it may be advantageous to pick off the electric potential of the two electrodes in the vicinity of adjacent end faces of the electrodes. In particular, a voltage measuring signal can also be picked off from each of the pairs of adjacent electrode end faces, the measuring signals being evaluated individually or in combination, depending on the configuration. In one configuration, for example, signals are added and in another configuration a mean value is formed. The different signal pickoffs make it possible, for example, to avoid calibrations for different filling levels for the respectively picked-off voltage signals or allow the accuracy of the measurements to be increased. In an alternative configuration, the signal pickoff takes place at other regions of the electrodes at a distance from the end faces. In an additional configuration, in particular, for the measuring of the filling level, the two electrodes are short-circuited with one another at the end faces outside the measuring line.

In a configuration associated with the previously mentioned configuration, at least one evaluation device is provided, evaluating frequency-selectively at least one measuring signal picked off from the two electrodes. As described above, in one configuration, the frequencies of the magnetic and supplementary magnetic fields are different from one another. This difference in frequency is therefore used in the evaluation to separate the induced voltages generated by the respective field from one another. In this configuration, therefore, the evaluation device evaluates frequency-selectively at least one measuring signal picked off from the electrodes. In this configuration, the correspondingly configured evaluation device determines at least from the at least one measuring signal the filling level of the medium with the aid of a correction factor and/or with the aid of calibration data.

The correction factor is, in this case, dependent in particular on the geometry of the flowmeter in the region of the two electrodes. Variables that are relevant to the geometry are, for example, the form of the side wall of the measuring line in the region of the measuring plane defined by the electrodes, the form and arrangement of the electrodes and the nature of the supplementary magnetic field between the two electrodes. Furthermore, the correction factor may also be dependent on the properties of the medium.

In a special configuration, the evaluation device is configured in such a way that the evaluation device determines at least from the at least one measuring signal an effective filling level value and determines from this the filling level of the medium by multiplication by the number 2. In this configuration, the evaluation device determines from the evaluation of the measuring signal a filling level value that corresponds to half the actual filling level. Particularly associated with the last configuration, in a variant, is that the measuring line has a circular cross section in the region of the two electrodes, and that the electrodes are configured in strip form and are attached to the measuring line laterally and symmetrically in relation to one another, for example, on the inner side.

Relating to the configuration and arrangement of the two electrodes, in particular, within the scope of the aforementioned configurations is a variant which provides that the adjacent end faces are spaced apart from one another in relation to the circumference of the measuring line, the distance between the adjacent end faces corresponding at most to a 45° angle—measured from the center point of the measuring line.

In a variant, the supplementary magnetic field generating device has at least two coils. In this case, one coil is arranged ahead of and the other coil behind the two electrodes along the longitudinal axis of the measuring line. In one configuration, the two coils are configured essentially identically and in a further form of implementation they are flowed through by the same current. In one embodiment, the distance between the two coils here is less than one quarter of the diameter of the measuring line, this configuration not necessarily relating to the cross section of a circular measuring line, so that the diameter is understood as meaning the average distance between portions of the measuring line that are opposite one another.

In specific terms, there are many possible ways of configuring and developing the flowmeter according to the invention. In this respect, reference is made to the following description of an exemplary embodiment in conjunction with the accompanying drawings.

DETAILED DESCRIPTION OF THE INVENTION

Figure 1:
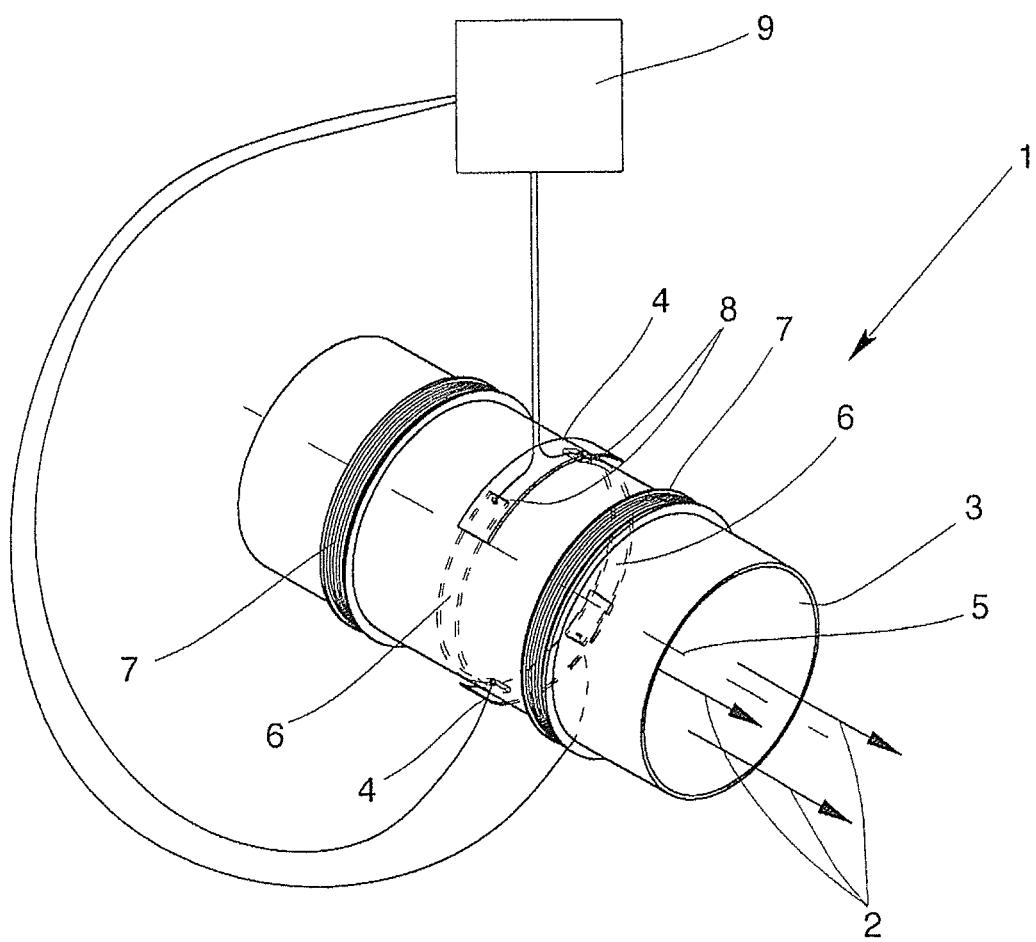
FIG. 1 shows a schematic spatial representation of a flowmeter, essentially illustrating the functional interrelationships.

In drawings, an embodiment of a meter 1 according to the invention is represented in a schematic form. More specifically, FIG. 1 shows a magnetic-inductive flowmeter 1 for measuring the through-flow and the filling level of a flowable and electrically conductive medium 2 within a measuring line 3. By the term "Filling level", it is meant here generally as the degree to which the medium 2 fills the measuring line 3. This value is essential for the determination of the through-flow and is determined by the flowmeter 1 according to the invention. Only schematically indicated here, above and below the measuring line 3 is the magnetic field generating device 4 for generating a magnetic field, which extends perpendicular to the longitudinal axis 5 of the measuring line 3 and consequently, in particular, perpendicular to the direction of flow of the medium 2, which here, by way of example, is a flowing liquid (illustrated by the arrows). The magnetic field generating device 4 is represented here only very schematically as two pole shoes located opposite one another. Not explicitly represented in this connection—since sufficiently well known from the prior art—is/are the coil(s) for generating the magnetic field.

Provided laterally are the two electrodes 6, configured here in strip form, the connecting lines of which are perpendicular to the longitudinal axis 5 and perpendicular to the aforementioned magnetic field. These electrodes 6 allow the induced voltage, that is generated in the medium 2 by the magnetic field generating device 4 and is a measure of the through-flow of the medium 2, to be picked off The two electrodes 6 lying opposite one another define, in particular, a measuring plane in the measuring line 3, which is arranged essentially perpendicularly to the longitudinal axis 5 of the measuring line 3.

Provided for the measuring of the filling level of the medium 2 is the supplementary magnetic field generating device 7, which is formed here by two coils located ahead of and behind the electrodes 6 axially along the longitudinal axis 5. These coils generate a (supplementary) magnetic field, which is oriented in the direction of the longitudinal axis 5, that is to say perpendicular to the field that is generated by the magnetic field generating device 4. The field generated by the supplementary magnetic field generating device 7, in this case in particular, passes through the space of the measuring line 3 that is enclosed by the two electrodes 6.

The strip-form electrodes 6 have, in each case, two end faces 8, which form two pairs of adjacent end faces 8. The end faces 8 are, in this case, spatially kept apart from one another and electrically isolated from one another. The flowing medium 2 and the supplementary magnetic field, in particular alternating supplementary magnetic field, generated by the supplementary magnetic field device 7, produce a voltage signal in the electrodes 6 which allows the determination of the filling level or at least of a correction value for the determination of the through-flow of the medium 2. This calculation or evaluation of the voltage signal picked off from the two electrodes 6 is performed by an evaluation device 9, which is connected, here, directly to the two electrodes 6. In other variants—not represented here—the connection between the electrodes 6 and the evaluation device 9 takes place indirectly by way of further components.

In the embodiment represented, a measuring signal is respectively picked off from the pair of upper and lower end faces 8 and fed to the evaluation device 9. The electrical isolation of the electrodes 6 from one another is also ensured here. The evaluation device 9 allows, in particular, a frequency-selective evaluation of the measuring signals.

Figure 2:
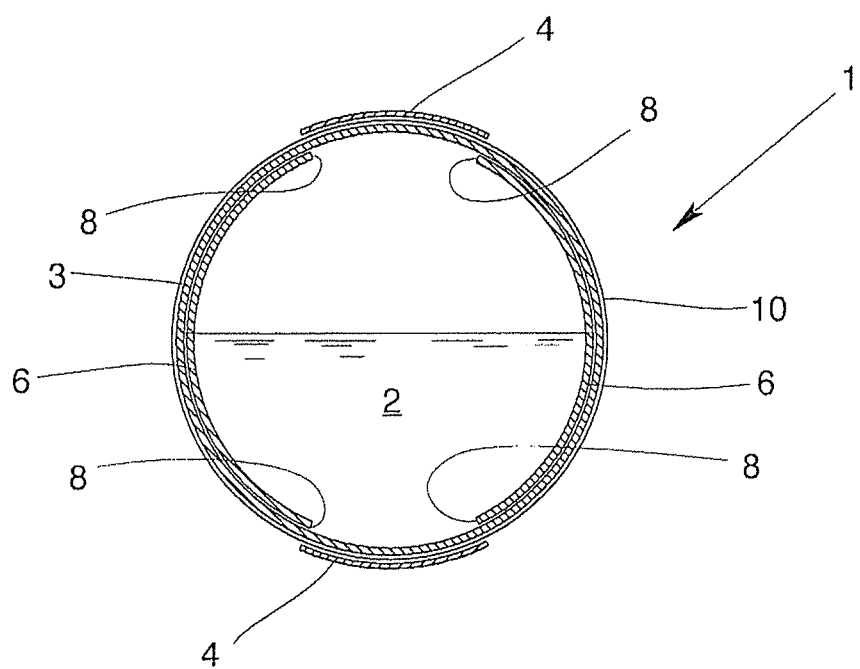
FIG. 2 shows a section through the measuring line of the meter represented in FIG. 1
Figure 3:
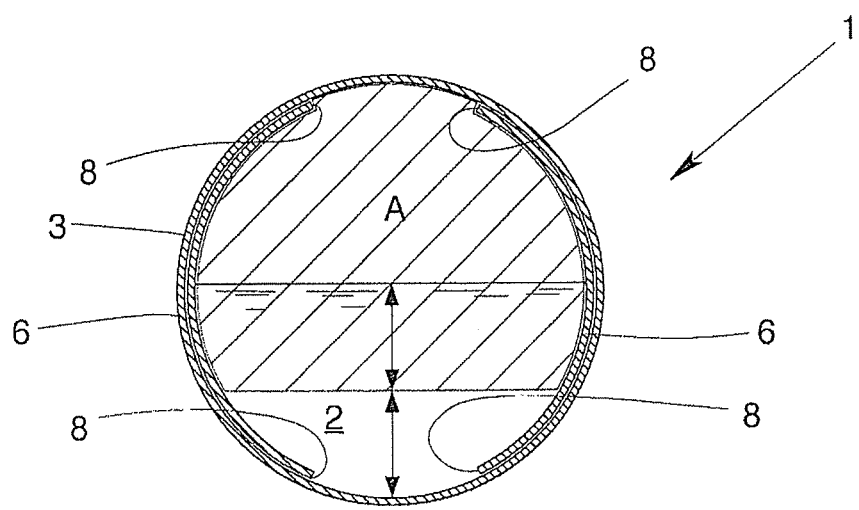
FIG. 3 shows part of FIG. 2 to illustrate the relevant geometry.

FIGS. 2 & 3 show a section through the flowmeter 1 of FIG. 1 at the location of the electrodes 6. It can be seen that the electrodes 6 extend in strip form around the inner circumference of the, here, circular measuring line 3. The measuring line 3 may take any form desired; it may even be an open or closed channel. The electrodes 6 are identically configured and lie essentially symmetrically in relation to one another.

The supplementary magnetic field generated by the supplementary magnetic field generating device 7 is perpendicular to the plane of the drawing and the magnetic field generated by the magnetic field generating device 4 extends parallel to the plane of the drawing. Measuring signals which are dependent on the induced voltage that is obtained as a result of the supplementary magnetic field pass through the measuring plane laterally enclosed by the two electrodes 6 and are respectively picked off from the upper and lower pairs of end faces 8 of the electrodes 6.

In FIG. 3, components other than the measuring line 3 and the electrodes 6 have been omitted for the sake of overall clarity. The measuring signals can be used to determine an effective filling level which, in the case of the setup represented, corresponds essentially to half the actual filling level of the medium 2 (see FIG. 3). The effective filling level relates, in this case, to the height of the effective conducting path above ground of the measuring line that encloses the area A of the measuring plane that is applicable to the measurement. For the calculation, it is assumed that the induced voltage is obtained from the change over time of the magnetic flux. The flux is, in turn, determined here by way of the surface integral over the supplementary magnetic field (B) in the area A. A further dependence is obtained by the change over time of the filling level (that is dA/dt) of the medium 2. Therefore, in particular, if an additional (supplementary) alternating magnetic field (dB/dt) is generated, the voltage (U) that is a measure of the filled area (A) can be picked off. In particular, only the induced voltage is picked off here from the two electrodes 6.

If A is the effectively applicable area between the two electrodes 6 and B is the supplementary magnetic field, the following is essentially obtained for the measured voltage U:

$$U = B*dA/dt + A*dB/dt.$$

In FIG. 3, the area A, which extends over the entire inner region between the electrodes 6 up to the effective filling height, is indicated by hatching. The filling-level-dependent alternating current signal U may be determined here, for example, by way of a preamplifier and an integrator circuit. The value for A*dB/dt may change by a factor of 10 to 100, depending on the diameter of the measuring line 3 between the smallest diameter and the largest diameter. The reason for this is that A is proportional to the square of the diameter and B is inversely proportional to the diameter. In order to optimize the measurements, there are setting variables in the frequency of the alternating supplementary magnetic field B, the value of A*dB/dt in first approximation being proportional to the frequency of the field B. Furthermore, the number of turns of the coils that serve for generating the supplementary magnetic field can be chosen appropriately. In this respect, the size of the supplementary magnetic field B, and as a result the value proportional to the change over time A*dB/dt in first approximation, is proportional to the number of turns of the coils causing the supplementary magnetic field. Furthermore, the strength of the magnetic field B in first approximation is inversely proportional to the distance between the coils, so that the variation of this distance can also be used to influence the factor dB/dt.

Since, depending on the configuration, the cross sections of the measuring line 3 usually lie between 1 cm and 1 m, the aforementioned variables allow the signal amplitudes to be set in such a way that essentially an evaluation device for any diameter of the measuring line is used. In the configuration shown, the actual filling level is obtained by multiplying the determined effective filling level by a factor of two. In other geometries, the actual filling level is obtained by a correction value to be determined correspondingly. Alternatively or in addition, calibration data for different filling levels are determined and used in the evaluation of the measuring signals.

The meter 1 also allows, in a method which is easier than that according to the prior art, measuring of the impedance of the electrodes 6 and from the measurements obtained also for a value for the conductivity of the medium 2 to be obtained. Since the supplementary magnetic field generates a voltage in the electrodes 6, it is sufficient for this to connect and disconnect a known resistance parallel to ground.

Provided around the measuring line 3 is also a reference line 10. In an alternative configuration, the reference line 10 may also be introduced the measuring line 3 into a liner lining. Here, the reference line 10 is in the plane that is defined by the electrodes 6 as the measuring plane, and serves for the measuring or monitoring of eddy currents. Such eddy currents may depend on the material of the measuring line 3, on the conductivity of the medium 2, on conductive or magnetic deposits on the inner side of the measuring line 3 or on electrically conductive or magnetic particles in the medium 2. The reference line 10 is, in particular, free from contact with the medium 2.

What is claimed is:

1. Magnetic-inductive flowmeter for measuring the through-flow of a flowing medium, comprising:
   a measuring line,
   a magnetic field generating device for generating a an alternating magnetic field passing at least partially through the measuring line essentially perpendicular to a longitudinal axis of the measuring line,
   at least two electrodes for picking off a measuring voltage induced in the flowing medium (2), and
   at least one supplementary magnetic field generating device for generating a supplementary alternating supplementary magnetic field at least partially passing through the measuring line at least partially essentially parallel to the longitudinal axis of the measuring line in a region of the measuring line in which the at least two electrodes are located.

2. Magnetic-inductive flowmeter according to claim 1, wherein the magnetic field generating device generates an alternating magnetic field with a first frequency, wherein the supplementary magnetic field generating device generates an alternating supplementary magnetic field with a second frequency, and wherein the first frequency and the second frequency are different.

3. Magnetic-inductive flowmeter according to claim 1, wherein the two electrodes are configured in an essentially identical strip form.

4. Magnetic-inductive flowmeter according to claim 1, wherein the two electrodes are located opposite one another at the same location along the longitudinal axis of the measuring line.

5. Magnetic-inductive flowmeter claim 3, wherein each of the strip-form electrodes has two end faces and wherein a measuring signal of the induced measuring voltage can be respectively picked off from a pair of adjacent end faces by electrical measuring pickoffs being arranged in this region.

6. Magnetic-inductive flowmeter claim 1, further comprising at least one evaluation device for frequency-selectively evaluating at least one measuring signal picked off from the two electrodes.

7. Magnetic-inductive flowmeter according to claim 6, wherein the evaluation device is adapted for determining the filling level of the medium at least from the at least one measuring signal with the aid of a correction factor that is dependent at one of the geometry of the flowmeter in the region of the two electrodes and calibration data.

8. Magnetic-inductive flowmeter according to claim 7, wherein the evaluation device is adapted for determining the filling level of the medium from multiplication of an effective filling level value, obtained at least from the at least one measuring signal, by 2.

9. Magnetic-inductive flowmeter claim 5, wherein the adjacent end faces are spaced apart from one another in relation to the circumference of the measuring line, the distance between the adjacent end faces corresponding at most to a 45° angle.

10. Magnetic-inductive flowmeter claim 1, wherein the supplementary magnetic field generating device has at least two coils, one of which is arranged ahead of the two electrodes and the other of which is arranged behind the two electrodes relative to the longitudinal axis of the measuring line.

* * * * *